(12) United States Patent
Potter

(10) Patent No.: US 11,113,096 B2
(45) Date of Patent: Sep. 7, 2021

(54) PERMISSIONS FOR A CLOUD ENVIRONMENT APPLICATION PROGRAMMING INTERFACE

(71) Applicant: HEWLETT PACKARD ENTERPRISE DEVELOPMENT LP, Houston, TX (US)

(72) Inventor: Timothy Martin Potter, Canberra (AU)

(73) Assignee: Hewlett Packard Enterprise Development LP, Houston, TX (US)

( * ) Notice: Subject to any disclaimer, the term of this patent is extended or adjusted under 35 U.S.C. 154(b) by 124 days.

(21) Appl. No.: 16/410,274

(22) Filed: May 13, 2019

(65) Prior Publication Data

US 2020/0364078 A1    Nov. 19, 2020

(51) Int. Cl.
*G06F 9/46*      (2006.01)
*H04L 29/06*     (2006.01)
*G06F 11/36*     (2006.01)

(52) U.S. Cl.
CPC .......... *G06F 9/468* (2013.01); *G06F 11/3688* (2013.01); *H04L 63/0281* (2013.01); *H04L 63/10* (2013.01)

(58) Field of Classification Search
USPC ........................................................ 717/124
See application file for complete search history.

(56) References Cited

U.S. PATENT DOCUMENTS

| 7,149,510 | B2  |          | 12/2006 | Hansson et al. |              |
|-----------|-----|----------|---------|----------------|--------------|
| 9,147,066 | B1  |          | 9/2015  | Tian et al.    |              |
| 10,467,426| B1  | *        | 11/2019 | Esposito       | G06F 16/9024 |
| 2015/0229645 | A1 | *      | 8/2015  | Keith          | G06F 9/468 726/4 |
| 2015/0365431 | A1 | *      | 12/2015 | Iliev          | G06F 21/62 726/23 |
| 2016/0232344 | A1 |        | 8/2016  | Chung          |              |
| 2017/0359350 | A1 |        | 12/2017 | Li et al.      |              |
| 2019/0213104 | A1 | *      | 7/2019  | Qadri          | G06F 21/12   |
| 2020/0057671 | A1 | *      | 2/2020  | Bailey         | G06F 9/505   |
| 2020/0059370 | A1 | *      | 2/2020  | Abraham        | H04L 67/10   |

FOREIGN PATENT DOCUMENTS

WO    WO-2016129852 A1    8/2016

OTHER PUBLICATIONS

Puyang et al.; "Making Least Privilege the Low-Hanging Fruit in Clouds"; 2017 IEEE International Conference on Communications (ICC), 1-7. (Year: 2017).*

(Continued)

*Primary Examiner* — Qing Chen
*Assistant Examiner* — Clint Thatcher
(74) *Attorney, Agent, or Firm* — Trop, Pruner & Hu, P.C.

(57) ABSTRACT

In some examples, a system tests a program that includes code to invoke calls of an application programming interface (API) for managing resources of a cloud environment. As part of the testing of the program, the system determines permissions for the invoked calls of the API, creates a collection of the determined permissions, and associates the collection of the determined permissions with an access policy of the cloud environment, the access policy to control use of the API for managing resources of the cloud environment.

20 Claims, 4 Drawing Sheets

(56) References Cited

OTHER PUBLICATIONS

Hategekimana et al.; "Secure Hardware Kernels Execution in CPU+FPGA Heterogeneous Cloud"; 2018 International Conference on Field-Programmable Technology (FPT), 182-189. (Year: 2018).*

Rodero-Merino et al.; "Building Safe PaaS Clouds: A Survey on Security in Multitenant Software Platforms"; Computers & Security, 31(1), 96-108; 2012. (Year: 2012).*

NPMJS, Permission-middleware <www.npmjs.com/package/permission-middleware> downloaded Oct. 25, 2018 (11 pages).

* cited by examiner

PERMISSIONS FOR A CLOUD ENVIRONMENT APPLICATION PROGRAMMING INTERFACE

BACKGROUND

A cloud environment includes resources that are useable by tenants of the cloud environment. Examples of cloud environments include public cloud environments, private cloud environments, and hybrid cloud environments.

BRIEF DESCRIPTION OF THE DRAWINGS

Some implementations of the present disclosure are described with respect to the following figures.

Figure 1:
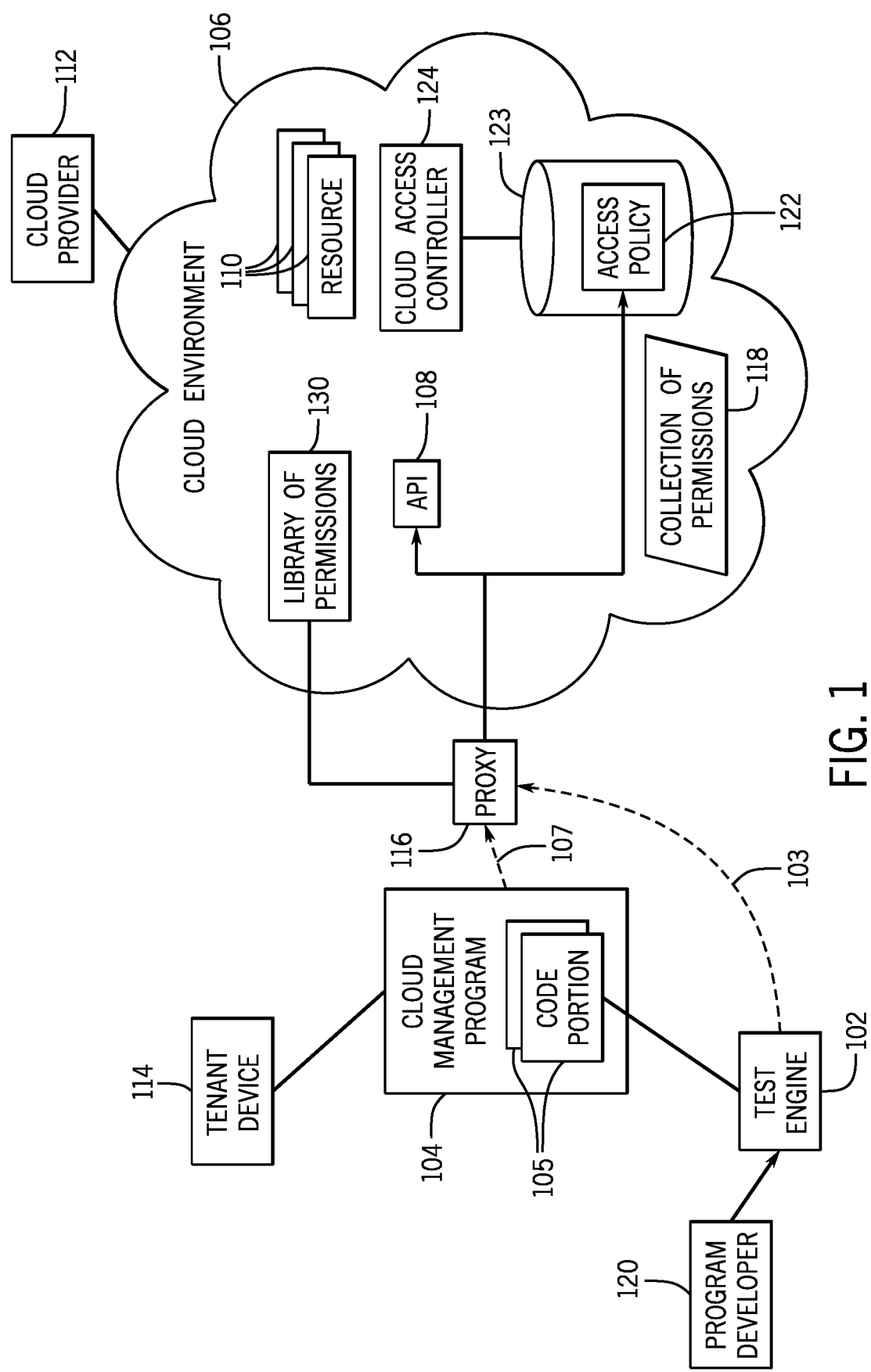
FIG. 1 is a block diagram of an arrangement that includes a test engine, a cloud management program, and a cloud environment, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Examples of resources of a cloud environment that can be deployed for use by tenants of the cloud environment include any or some combination of the following: processing resources, storage resources, communication resources, programs (including machine-readable instructions), and so forth. A cloud environment can include a public cloud, which is a cloud available to tenants over a public network, such as the Internet. Alternatively, a cloud environment can include a private cloud, which is a cloud available to tenants with specified permissions, such as users within an enterprise that operates the private cloud. As a further example, a cloud environment can include a hybrid cloud, which can include a mix of public and private clouds.

In some cases, a cloud environment can include virtual resources that can be created in response to requests from tenants. A virtual resource an refer to a virtual machine (VM), a virtual processor, a virtual storage to store data, a virtual network device (e.g., a virtual switch or virtual router) to handle routing or transfer of data through a network, a virtual infrastructure that includes an arrangement of different virtual resources, or any other type of virtual resource.

In some cloud environments, an application programming interface (API) is provided that includes a set of operations that can be invoked by making respective calls to the API. Each call of the API (or "API call") causes a corresponding routine (also referred to as a "method") of the API to be invoked to perform a respective operation. Each routine invoked by an API call includes machine-readable instructions. The API can include multiple routines to perform respective operations.

In some examples, the API calls include calls to manage resources of a cloud environment. Managing resources of the cloud environment can include any or some combination of the following: creating a resource in the cloud environment (e.g., creating a VM or another resource), modifying a resource in the cloud environment (e.g., modifying a VM or another resource), removing a resource in the cloud environment (e.g., remove or destroy a VM or another resource), or performing another action with respect to a resource in the cloud environment.

For security, the cloud environment may associate permissions with API calls to prevent unauthorized acts with respect to the resources of the cloud environment. For example, the permissions may prevent the creation of a VM or another resource by an entity that is not authorized to create VMs.

A cloud management program (including machine-readable instructions) may be used to manage resources of the cloud environment. In some cases, a human administrator may manually set a collection of permissions for the cloud management program. This collection of permissions can be included in an access policy of the cloud environment, and the collection of permissions included in the access policy governs whether API calls made by the cloud management program for managing resources (e.g., creating a resource, modifying a resource, removing a resource, etc.) are permitted.

Because the human administrator may not know what specific calls to the API of the cloud environment will be made by a given cloud management program, the collection of permissions that is manually set may over-provision or under-provision permissions. If too many permissions are included in the access policy, then the cloud management program may perform actions in the cloud environment that the cloud management program does not have to perform, which may lead to privilege escalation or information disclosure or security vulnerabilities that can be exploited by malicious actors. On the other hand, if too few permissions are included in the access policy, then the cloud management program may not be able to perform API calls leading to incorrect operation.

In accordance with some implementations of the present disclosure, as shown in FIG. 1, a test engine 102 can be used to test a cloud management program 104 for determining a minimum set of permissions to associate with an access policy 122 in a cloud environment 106 for the cloud management program 104.

As used here, a "program" can include machine-readable instructions that can be executed by a computer system that includes a computer or multiple computers. Although referred to in the singular sense, a "program" can actually refer to a collection of programs (one program or multiple programs).

An "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The test engine 102 can select a portion of the cloud management program 104 to test. The selected portion of the cloud management program 104 can include code to invoke calls of an API 108 to perform respective operations, including management of resources 110 of the cloud environment 106. A portion of the cloud management program 104 that is tested is represented as a "code portion" 105 in FIG. 1. Any of multiple code portions 105 cloud management program 104 can be selected by the test engine 102 for testing.

During operation of the cloud management program 104, in response to requests from tenant devices (such as the tenant device 114 shown in FIG. 1), the code portions 105 of the cloud management program 104 can issue API calls 107 to the cloud environment 106 to perform management tasks with respect to the cloud access controller 124. The cloud access controller 124 can be implemented using a hardware processing circuit or a combination of a hardware processing circuit and machine-readable instructions executable on the hardware processing circuit.

The API 108 is associated with the cloud environment 106. In some cases, the API 108 can be part of the cloud environment 106. In other examples, the API 108 can be outside of the cloud environment 106. The API 108 may be defined by the cloud provider 112.

The cloud environment 106 is provided by a cloud provider 112, which can be a company or other entity that provides the resources 110 of the cloud environment 106 for access by tenants of the cloud environment 106. In some examples, the cloud environment 106 can include a public cloud that is available to any of various tenants over a public network. In other examples, the cloud environment 106 can include a private cloud, or a hybrid cloud that is made up of both a public cloud and a private cloud.

Users of the cloud environment 106 are referred to as "tenants." A tenant can refer to an individual user or a group of users (such as a company, a department or other group within a company, an educational organization, a government agency, etc.).

The API 108 includes a set of routines (also referred to as "methods") that can be used by calls to the API 108 (referred to as API calls). The API calls can be made by the cloud management program 104, such as in response to requests from a tenant device 114 in use by a tenant. The tenant device 114 can include a desktop computer, a notebook computer, a tablet computer, a smartphone, or any other type of electronic device.

The management of resources 110 that can be performed by the cloud management program 104 includes the creation of a VM or another virtual resource, the modification of a VM or other virtual resource, the removal or destruction of a VM or another resource, or any other type of management action with respect to any type of resource of the cloud environment 106. The management actions are performed based on calls to the API 108 by the cloud management program 104.

The testing performed by the test engine 102 is to determine what permissions have to be provided to allow the cloud management program 104 to allow API calls 107 made by the cloud management program 104 to perform the respective management tasks.

A "permission" can refer to a rule or any other indication that is used by a cloud access controller 124 of the cloud environment 106 to determine whether an entity, such as the cloud management program 104, making an API call has the right to make such an API call.

During a test process, the test engine 102 determines the API calls included in a selected code portion 105 of the cloud management program 104, and invokes the API calls 103 of the selected code portion 105. The test engine 102 can select any code portion 105 of the cloud management program 104. The test engine 102 can analyze the selected code portion 105 to determine any API calls made in the selected code portion 105. In some cases, the test engine 102 can select multiple code portions 105 of the cloud management program 104 to test.

Different code portions 105 of the cloud management program 104 can operate different parts of the cloud environment 106. For example, a first code portion 105 of the cloud management program 104 can manage virtual processing resources (e.g., VMs). A second code portion 105 of the cloud management program 104 can manage virtual storage resources of the cloud environment 106, used for storing information. A third code portion 105 of the cloud management program 104 can manage virtual communication resources of the cloud environment 106, such as virtual switches, virtual routers, or other virtual network devices used for handling communication of data over a network. In further examples, other code portions can be used for managing other resources of the cloud environment 106.

The invoked API calls 103 from the test engine 102 are received by a proxy 116 associated with the API 108. The proxy 116 can include machine-readable instructions. In some examples, the proxy 116 may be a component outside the cloud environment 106. As an example, the proxy 116 can include a wrapper for the API 108 for intercepting API calls 103 directed to the API 108. Alternatively, the proxy 116 can include another type of intermediary to receive API calls 103 issued by the test engine 102.

In some examples, API calls 107 issued by the cloud management program 104 during execution of the cloud management program 104 can bypass the proxy 116, and can be issued directly to the API 108.

The proxy 116 can determine, for each API call 103 received from the test engine 103, a permission (one permission or multiple permissions) for the API call 103. The proxy 116 can build up a collection 118 of permissions for the API calls 103 of the selected code portion 105 of the cloud management program 104.

The collection 118 of permissions can be the minimum set of permissions for the cloud management program 104 to perform its resource management tasks based on use of the API 108.

As shown in FIG. 1, the test engine 102 can be operated by a program developer 120, which can be a developer that participated in developing (e.g., creating, modifying, testing, etc.) the cloud management program 104. In other examples, a different entity (a human, a machine, or a program) can operate the test engine 102.

The proxy 116 can add the collection 118 of permissions to the access policy 122 of the cloud environment 106. The access policy 122 can be stored in a storage medium 123, implemented using a storage device or multiple storage devices. In some examples, the storage medium 123 can be implemented using a disk-based storage medium, a solid state memory, and so forth.

The cloud access controller 124 manages access of the resources 110 of the cloud environment 106 based on the access policy 118. For example, in response to a given API call 107 from the cloud management program 104, the cloud access controller 124 can access the access policy 122

(which includes the collection 118 of permissions) to determine whether the cloud management program 104 has the requisite permission to use of the API 108 for managing resources of the cloud environment 106 in response to the given API call 107.

In some examples, the same access policy 122 can be provided for different tenants that use the cloud management program 104 to manage the resources 110 of the cloud environment 106.

Figure 2:
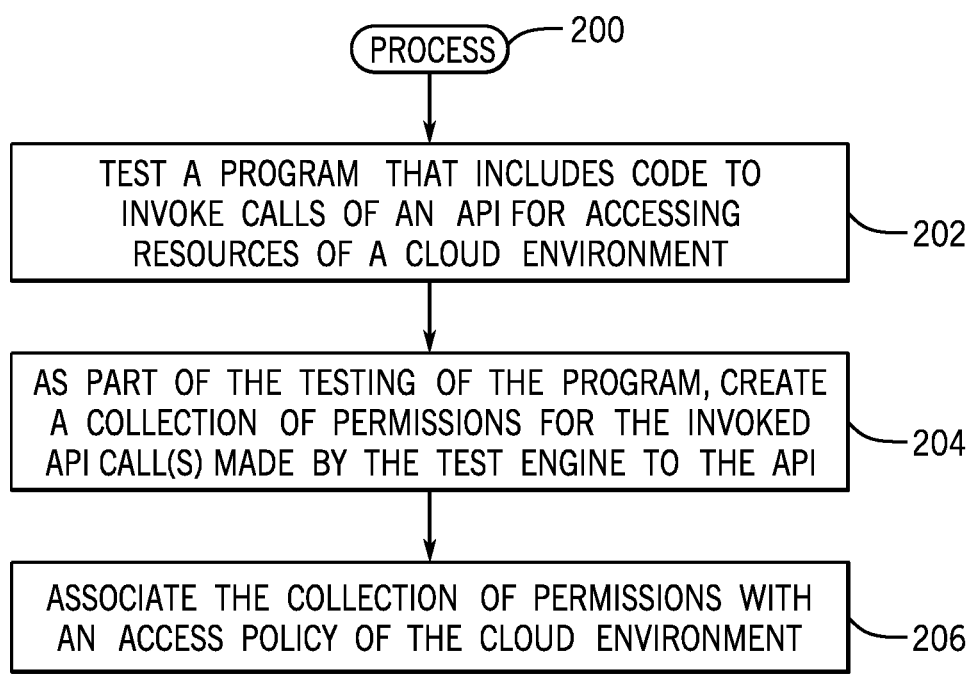
FIGS. 2 and 3 are flow diagrams of processes according to some examples.

FIG. 2 is a flow diagram of a process 200 for determining the collection 118 of permissions based on API calls made by the test engine 102, in accordance with some implementations of the present disclosure.

The test engine 102 tests (at 202) a program (e.g., 104 in FIG. 1) that includes code (e.g., a code portion 105) to invoke calls of an API (e.g., 108) for accessing resources of a cloud environment (e.g., resources 110 of the cloud environment 106).

As noted above, the test engine 102 can select a code portion 105 and determine API call(s) included in the selected code portion 105. The test engine 102 can issue the determined API call(s) (e.g., 103 in FIG. 1) to the API 108. The issued API call(s) are received by the proxy 116.

As part of the testing of the program, the proxy 116 creates (at 204) a collection (e.g., 118 in FIG. 1) of permissions for the invoked API call(s) made by the test engine 102 to the API. For each API call received from the test engine 102, the proxy 116 access a library of permissions 130 that maps permissions to respective API calls that can be made to the API 108. The library of permissions 130 can be provided by the cloud provider 112. The library of permissions 130 can map all possible API calls that can be made to the API 108 to corresponding permissions for the API calls. For example, the library of permissions 130 can map a first API call to a first routine of the API 108 to a first permission (or first permissions), map a second API call to a second routine of the API 108 to a second permission (or second permissions), and so forth.

The API calls that may be included in the selected code portion(s) 105 of the cloud management program 104 may include just a subset of all the API calls that can be made to the API 108. Thus, permissions to be included in the collection 118 of permissions determined by the proxy 116 in response to the API calls 103 received from the test engine 102 can include a subset of all the possible permissions that can be associated with the API calls of the API 108.

The proxy 116 associates (at 206) the collection of permissions with an access policy (e.g., 122) of the cloud environment. The access policy controls use of the API for managing resources of the cloud environment.

In response to a change of the program, the test engine 102 tests (at 208) the changed program by invoking calls of the API included in code of the changed program. In response to the calls of the API included in the code of the changed program, the proxy 116 creates (at 210) an updated collection of permissions for the invoked calls of the API included in the code of the changed target program. The proxy 116 associates (at 212) the updated collection of permissions with the access policy of the cloud environment.

Figure 3:
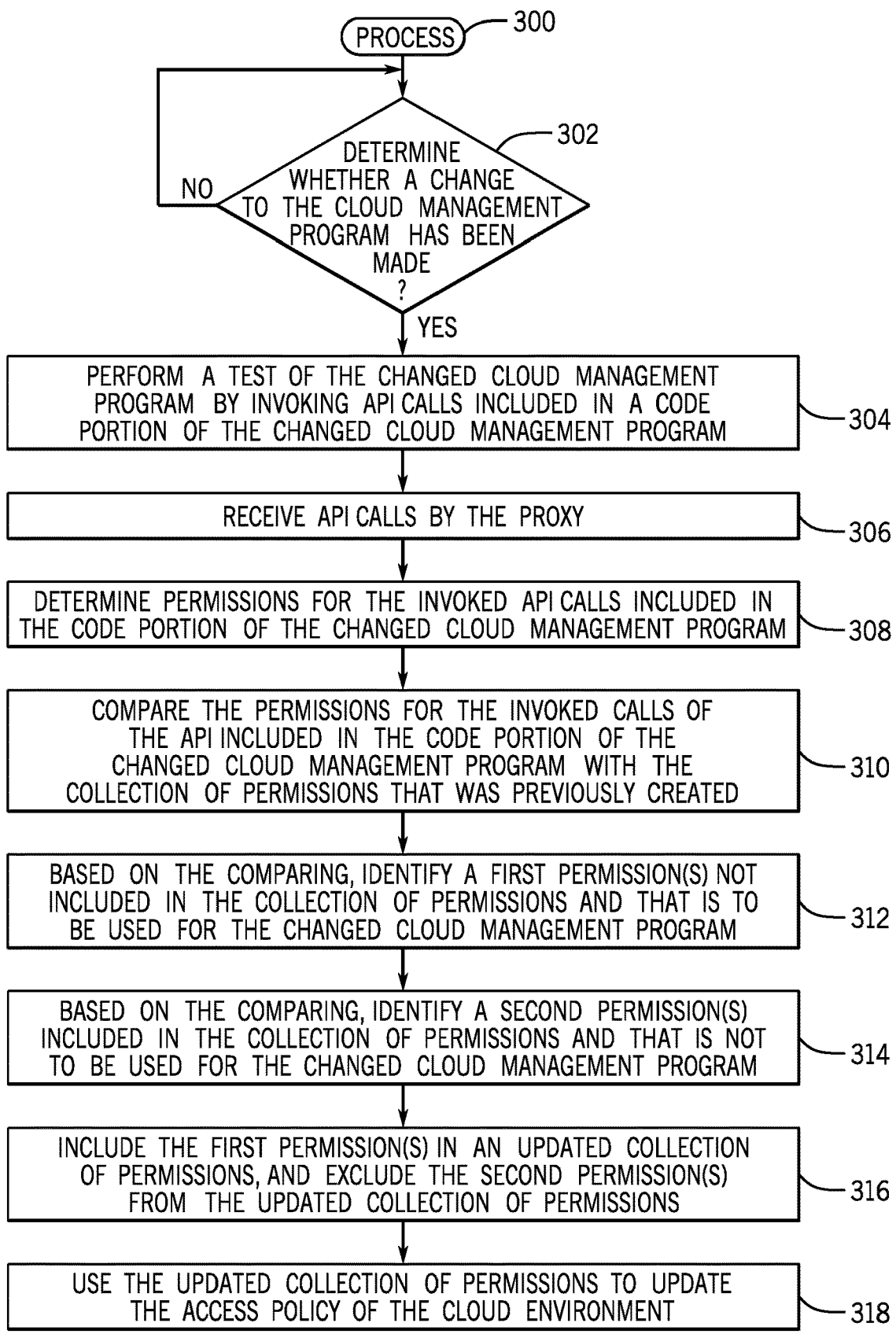

FIG. 3 is a flow diagram of the process 300 of updating the collection 118 of permissions, in response to a change of the cloud management program 104.

The process 300 can be performed by interaction between the test engine 102 and the proxy 116, for example.

The test engine 102 determines (at 302) whether a change to the cloud management program 104 has been made. This detection can be made based on an indication provided to the test engine 102. For example, the program developer 120 can use a user device to generate a notification to the test engine 102 that the cloud management program 104 has changed. In other examples, the test engine 102 can monitor the cloud management program 104, and can detect when a new or modified version of the cloud management program 104 has been installed.

If no change to the cloud management program 104 is detected, the process 300 exits. However, if the test engine 102 detects a change in the cloud management program 104, the test engine 102 performs (at 304) a test of the changed cloud management program 104 by invoking API calls included in a code portion of the changed cloud management program 104. The API calls are received (at 306) by the proxy 116. The proxy 116 determines (at 308) permissions for the invoked API calls included in the code portion of the changed cloud management program 104.

The proxy 116 compares (at 310) the permissions for the invoked calls of the API included in the code portion of the changed cloud management program 104 with the collection 118 of permissions that was previously created (e.g., in task 204 of FIG. 2). Based on the comparing, the proxy 116 identifies (at 312) a first permission (or multiple first permissions) not included in the collection 118 of permissions and that is to be used for the changed cloud management program 104. In other words, the first permission(s) include(s) those permission(s) not included in the collection 118 of permissions but that are to be provided for the changed cloud management program 104 to allow the changed cloud management program 104 to properly access the cloud environment 106 using the API 108.

The proxy 116, based on comparing, also identifies (at 314) a second permission (or multiple second permissions) included in the collection 118 of permissions and that is not to be used for the changed cloud management program 104. The proxy 116 includes (at 316) the first permission(s) in an updated collection of permissions, and excludes (at 316) the second permission(s) from the updated collection of permissions.

The updated collection of permissions can then be used to update (at 318) the access policy 122 of the cloud environment 106.

Figure 4:
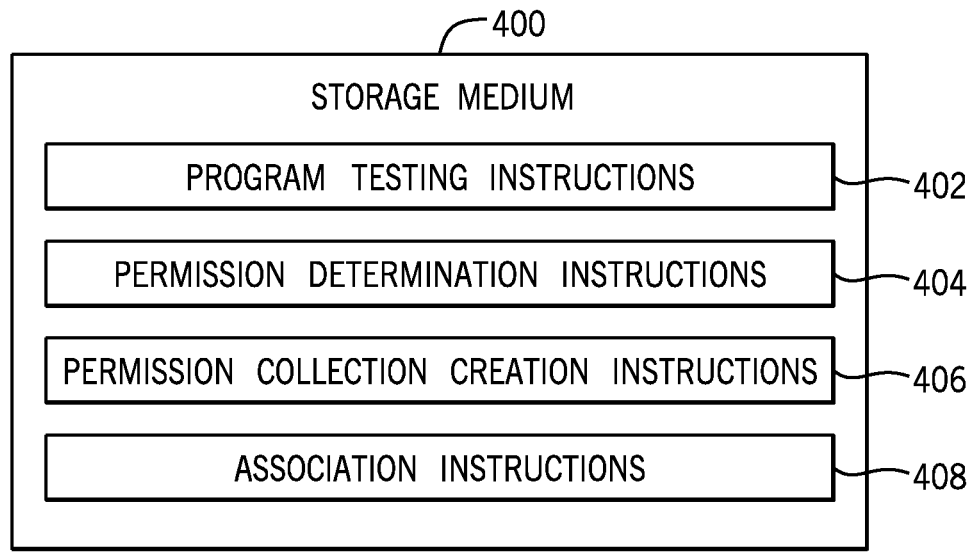
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a system to perform various tasks.

The machine-readable instructions include program testing instructions 402 (e.g., which can be part of the test engine 102) to test a program that includes code to invoke calls of an API for managing resources of a cloud environment. The calls of the API invoked by the program testing instructions 402 can include a call selected from among a call to create a resource in the cloud environment, a call to modify a resource in the cloud environment, a call to remove a resource in the cloud environment, or any other type of call to manage a resource.

The machine-readable instructions include permission determination instructions 404 to, as part of the testing of the program, determine permissions for the invoked calls of the API. The determining of the permission associated with each of the calls may include accessing a library (e.g., 130) that maps permissions to respective API calls.

The machine-readable instructions also include permission collection creation instructions 406 to create a collection (e.g., 118 in FIG. 1) of the determined permissions. The created collection of the determined permissions can include the minimum set of permissions that the tested program would require to access the cloud environment 106 to manage resources using the API 108.

The machine-readable instructions include association instructions 408 to associate the collection of the determined permissions with an access policy (e.g., 122 in FIG. 1) of the cloud environment, the access policy to control use of the API for managing resources of the cloud environment. The associating can include adding the collection of the determined permissions to the access policy.

The permission determination instructions 404, the permission collection creation instructions 406, and/or the association instructions 408 can be part of the proxy 116, for example.

Figure 5:
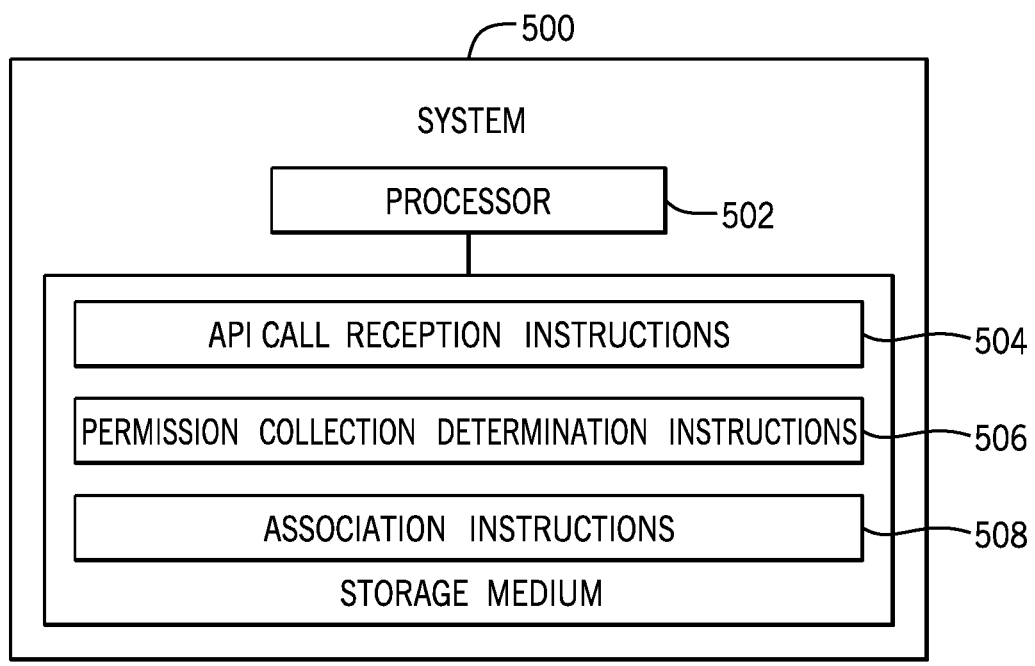
FIG. 5 is a block diagram of a system according to some examples.

FIG. 5 is a block diagram of a system 500 including a hardware processor 502 (or multiple hardware processors). The system 500 can include a computer or multiple computers. A hardware processor can include a microprocessor, a core of a multi-core microprocessor, a microcontroller, a programmable integrated circuit, a programmable gate array, a digital signal processor, or another hardware processing circuit.

The system 500 includes a storage medium 504 that stores proxy instructions (e.g., that are part of the proxy 116) executable on the hardware processor 502 to perform various tasks. Instructions executable on a hardware processor can refer to the instructions executable on a single hardware processor or the instructions executable on multiple hardware processors.

The proxy instructions include API call reception instructions 506 to receive, from a test engine, calls of an API, the calls included in code of a target program that manages resources of a cloud environment.

The proxy instructions further include permission collection determination instructions 508 to determine a collection of permissions associated with the calls of the API. The proxy instructions further include association instructions 510 to associate the collection of the permissions with an access policy of the cloud environment, the access policy to control use of the API for managing the resources of the cloud environment.

A storage medium (e.g., 400 or 504) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   test a program that comprises code to invoke calls of an application programming interface (API) for managing resources of a cloud environment;
   as part of the testing of the program, determine permissions for the invoked calls of the API;
   create a collection of the determined permissions; and
   associate the collection of the determined permissions with an access policy of the cloud environment, the access policy to control use of the API for managing resources of the cloud environment.

2. The non-transitory machine-readable storage medium of claim 1, wherein the testing is performed by a test code.

3. The non-transitory machine-readable storage medium of claim 1, wherein the calls of the API comprise a call selected from among a call to create a resource in the cloud environment, a call to modify a resource in the cloud environment, or a call to remove a resource in the cloud environment.

4. The non-transitory machine-readable storage medium of claim 3, wherein the resources comprise a virtual resource.

5. The non-transitory machine-readable storage medium of claim 1, wherein the instructions that upon execution cause the system to:
   as part of the testing:
     receive, at a proxy, the calls of the API, and
     determine, by the proxy, a permission associated with each of the calls.

6. The non-transitory machine-readable storage medium of claim 5, wherein the determining of the permission associated with each of the calls comprises accessing a library that maps permissions to respective API calls.

7. The non-transitory machine-readable storage medium of claim 1, wherein the instructions that upon execution cause the system to:
   responsive to a change in the program:
     test the changed program by invoking calls of the API included in code of the changed program,
     create an updated collection of permissions for the invoked calls of the API included in the code of the changed program;
     associate the updated collection of permissions with the access policy of the cloud environment.

8. The non-transitory machine-readable storage medium of claim 7, wherein creating the updated collection of permissions comprises:
   determining permissions for the invoked calls of the API included in the code of the changed program;
   comparing the permissions for the invoked calls of the API included in the code of the changed program with the permissions for the invoked calls of the API included in the code of the program before the changing of the program.

9. The non-transitory machine-readable storage medium of claim 8, wherein creating the updated collection of permissions comprises:
   based on the comparing, identifying a first permission not included in the collection of the determined permissions and that is to be used for the changed program, and identifying a second permission included in the collection of the determined permissions and that is not used for the changed code, and including the first permission in the updated collection of permissions, and excluding the second permission from the updated collection of permissions.

10. The non-transitory machine-readable storage medium of claim 1, wherein testing the program comprises testing a portion of the program, the portion comprising the code to invoke calls of the API.

11. The non-transitory machine-readable storage medium of claim 10, wherein testing the portion of the program comprises testing a selected portion of a plurality of different portions of the program, the different portions managing different types of resources of the cloud environment.

12. A system comprising:
a processor; and
a non-transitory storage medium storing proxy instructions executable on the processor to:
receive, from a test engine, calls of an application programming interface (API) included in code of a target program that manages resources of a cloud environment;
determine a collection of permissions associated with the calls of the API; and
associate the collection of the permissions with an access policy of the cloud environment, the access policy to control use of the API for managing the resources of the cloud environment.

13. The system of claim 12, wherein associating the collection of the permissions with the access policy comprises including the collection of the permissions in the access policy.

14. The system of claim 12, wherein the access policy determines whether the target program is able to invoke calls to the API.

15. The system of claim 12, wherein the calls of the API comprise a call selected from among a call to create a virtual resource in the cloud environment, a call to modify a virtual resource in the cloud environment, or a call to remove a virtual resource in the cloud environment.

16. The system of claim 12, wherein the determining of the collection of permissions associated with the calls of the API comprises accessing a library that maps permissions to respective API calls, the library maintained by a provider of the cloud environment.

17. The system of claim 12, wherein the proxy instructions are executable on the processor to:
responsive to a change in the target program:
test the changed target program by invoking calls of the API included in code of the changed target program,
create an updated collection of permissions for the invoked calls of the API included in the code of the changed target program;
associate the updated collection of permissions with the access policy of the cloud environment.

18. The system of claim 17, wherein the creating of the updated collection of permissions comprises:
determining permissions for the invoked calls of the API included in the code of the changed target program;
comparing the permissions for the invoked calls of the API included in the code of the changed target program with the permissions for the invoked calls of the API included in the code of the target program before the changing of the target program.

19. A method performed by a system comprising a hardware processor, comprising:
testing a program that comprises code to invoke calls of an application programming interface (API) for accessing resources of a cloud environment;
as part of the testing of the program, creating a collection of permissions for the invoked calls of the API;
associating the collection of permissions with an access policy of the cloud environment, the access policy to control use of the API for managing resources of the cloud environment; and
in response to a change of the program,
testing the changed program by invoking calls of the API included in code of the changed program,
creating an updated collection of permissions for the invoked calls of the API included in the code of the changed program, and
associating the updated collection of permissions with the access policy of the cloud environment.

20. The method of claim 19, wherein the calls of the API comprise a call selected from among a call to create a resource in the cloud environment, a call to modify a resource in the cloud environment, or a call to remove a resource in the cloud environment.

* * * * *